US012677976B2

(12) United States Patent
LePinske

(10) Patent No.: US 12,677,976 B2
(45) Date of Patent: Jul. 14, 2026

(54) MUFFLER FOR PRESSURE COOKER

(71) Applicant: IB APPLIANCES US HOLDINGS LLC, Downers Grove, IL (US)

(72) Inventor: Jason L. LePinske, Schaumburg, IL (US)

(73) Assignee: IB APPLIANCES US HOLDINGS, LLC, Chicago, IL (US)

( * ) Notice: Subject to any disclaimer, the term of this patent is extended or adjusted under 35 U.S.C. 154(b) by 737 days.

(21) Appl. No.: 18/152,848

(22) Filed: Jan. 11, 2023

(65) Prior Publication Data

US 2023/0233012 A1     Jul. 27, 2023

Related U.S. Application Data

(60) Provisional application No. 63/301,573, filed on Jan. 21, 2022.

(51) Int. Cl.
*A47J 27/09*          (2006.01)

(52) U.S. Cl.
CPC ..................................... *A47J 27/09* (2013.01)

(58) Field of Classification Search
CPC ............................... A47J 27/09; A47J 27/092
See application file for complete search history.

(56) References Cited

U.S. PATENT DOCUMENTS

2020/0268201 A1     8/2020   Chen et al.

FOREIGN PATENT DOCUMENTS

| CN | 203987521 U | 12/2014 |
|---|---|---|
| CN | 103892717 B | 8/2016 |
| CN | 104068741 B | 9/2016 |
| CN | 104223930 B | 11/2016 |
| CN | 106691169 A | 5/2017 |
| CN | 107007157 A | 8/2017 |
| CN | 206612673 U | 11/2017 |
| CN | 206700033 U | 12/2017 |
| CN | 206867124 U | 1/2018 |
| CN | 107752785 A | 3/2018 |
| CN | 207520034 U | 6/2018 |
| CN | 108324123 A | 7/2018 |
| CN | 108720630 A | 11/2018 |
| CN | 210354391 U | 4/2020 |
| CN | 107951398 B | 6/2020 |
| KR | 20090019332 A | 2/2009 |
| WO | WO 2022/003582 A1 | 1/2022 |

OTHER PUBLICATIONS

International Search Report and Written Opinion in International Patent Application No. PCT/US23/60608 dated May 26, 2023, 15 pages.
Extended European Search Report issued in EP Application No. 23743842.9-1015 dated Nov. 17, 2025, 7 pages.

*Primary Examiner* — Robert G Bachner
(74) *Attorney, Agent, or Firm* — Crowell & Moring LLP

(57)          ABSTRACT

A muffler cover for an appliance includes a first room, second room, and a first channel. The second room is positioned separate from the first room. The first channel is connected to the first room via a first inlet and connected to the second room via a first outlet. The first channel changes from a first direction to a second direction and changes from the second direction to a third direction. The first direction is substantially opposite to the second direction, and the second direction is substantially opposite to the third direction. A muffler and an appliance using the muffler are also provided.

20 Claims, 7 Drawing Sheets

400

400

MUFFLER FOR PRESSURE COOKER

RELATED APPLICATION

This application claims priority to U.S. Provisional Application No. 63/301,573, entitled "Muffler for Pressure Cooker" and filed on Jan. 21, 2022, the entirety of which is hereby incorporated by reference in full.

TECHNICAL FIELD

This disclosure relates to components of a pressure cooker, and more particularly, a muffler for a pressure cooker.

BACKGROUND

Electric cooking appliances, such as electric pressure cookers (EPCs), are commonly used household appliances. A conventional EPC typically includes an operation panel having push buttons disposed thereon for controlling the operations of the appliance. Using the operation panel, a consumer can operate the EPC to create a high pressure, high temperature environment inside the cooking vessel of the EPC to thereby shorten cooking times. At the conclusion of the cooking cycle, the consumer must release pressurized gas, such as air and/or steam, from the vessel of the EPC, before accessing food contents therein. To that end, conventional EPCs include a pressure release valve designed to gradually release such pressurized gas. When these valves are opened, a plume of high-temperature and high-pressure air or steam is released from the EPC through the valve. To the average consumer, the noise generated by and turbulence of the released air or steam can be an intimidating process. Thus, an objective of the present disclosure is to muffle the pressurized gas released from an EPC during the depressurization process.

BRIEF DESCRIPTION OF THE DRAWINGS

The embodiments can be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

DETAILED DESCRIPTION

Figure 1:
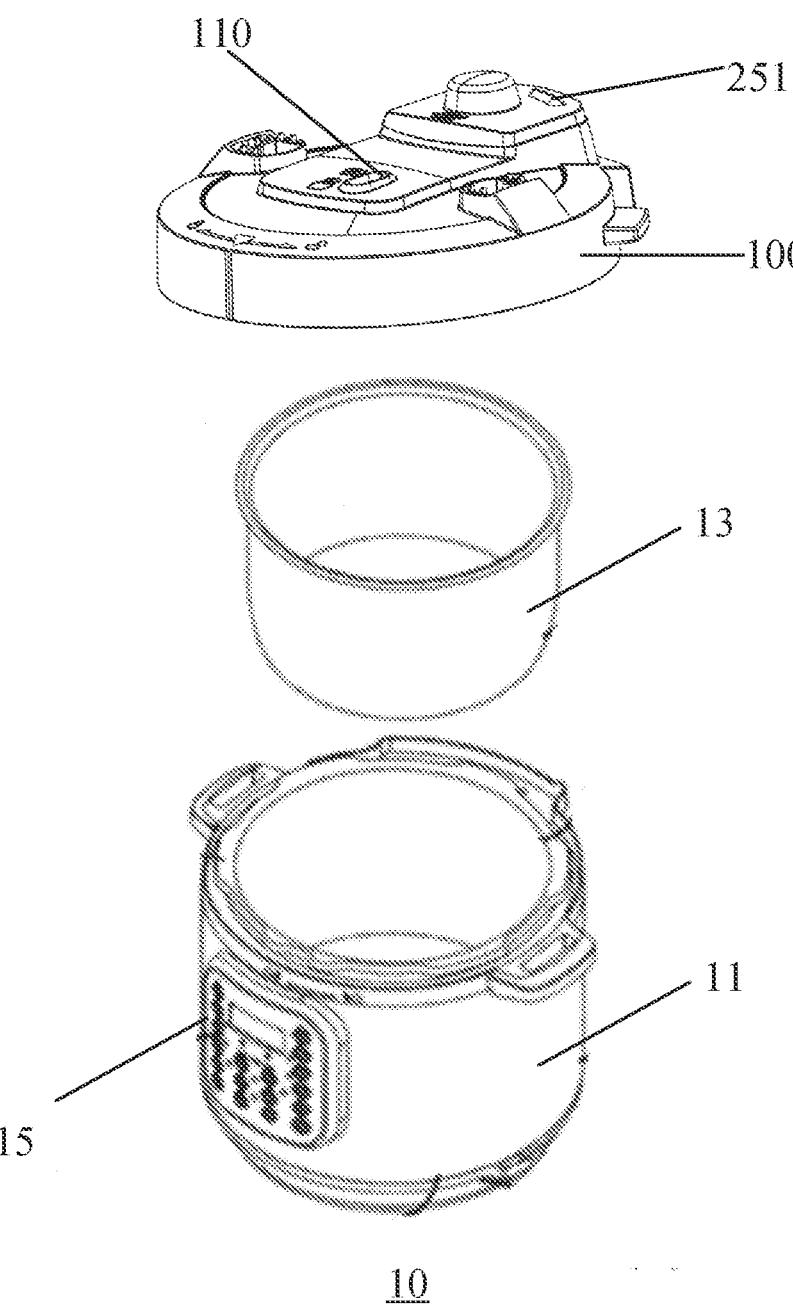
FIG. 1 is an exploded perspective view of an electric pressure cooker.

FIG. 1 is an exploded perspective view of a pressure cooker 10. The pressure cooker 10 generally includes a cooker body 11, an inner pot 13, and a lid 100. The cooker body 11 may further include a control panel 15 positioned at a side of the cooker body 11. The control panel 15 is used to control the function and operation of the pressure cooker 10. Via the control panel 15, the cooker body 11 can heat the food inside the inner pot 13 when the inner pot 13 is positioned inside the cooker body 11. The lid 100 is configured to close the cooker body 11 when the inner pot 13 is put insider the cooker body 11 to form an air-tight environment and maintain the pressure in the pressure cooker 10.

When a cooking operation is complete, a user may wait for the pressure and temperature in the pressure cooker 10 to subside, or the user can actuate rapid release of pressure via a pressure release valve. Specifically, the pressure cooker 10 may have a switch 110 allowing the user to open a valve 120 (as shown in FIG. 2B) of the pressure cooker 10. The switch 110 may be situated on the lid 100 or on another location of the pressure cooker 10, such as a location on the cooker body 11. The valve 120 is in fluid communication with the inner space of the pressure cooker 10, and therefore, once the valve is opened, pressurized gas, such as air or stream, rapidly exhausts via the valve 120 due to the pressure difference inside the pressure cooker 10 relative to the atmosphere. In one implementation, the switch 110 may engage with a lever (not shown), which controls a gate 122 (as shown in FIG. 2B) working with the valve 120. For example, the lever may elevate the gate 122 such that opening of the valve 120 is no longer blocked by the gate 122. The pressurized steam therefore can exit through the valve 120.

Figure 2A:
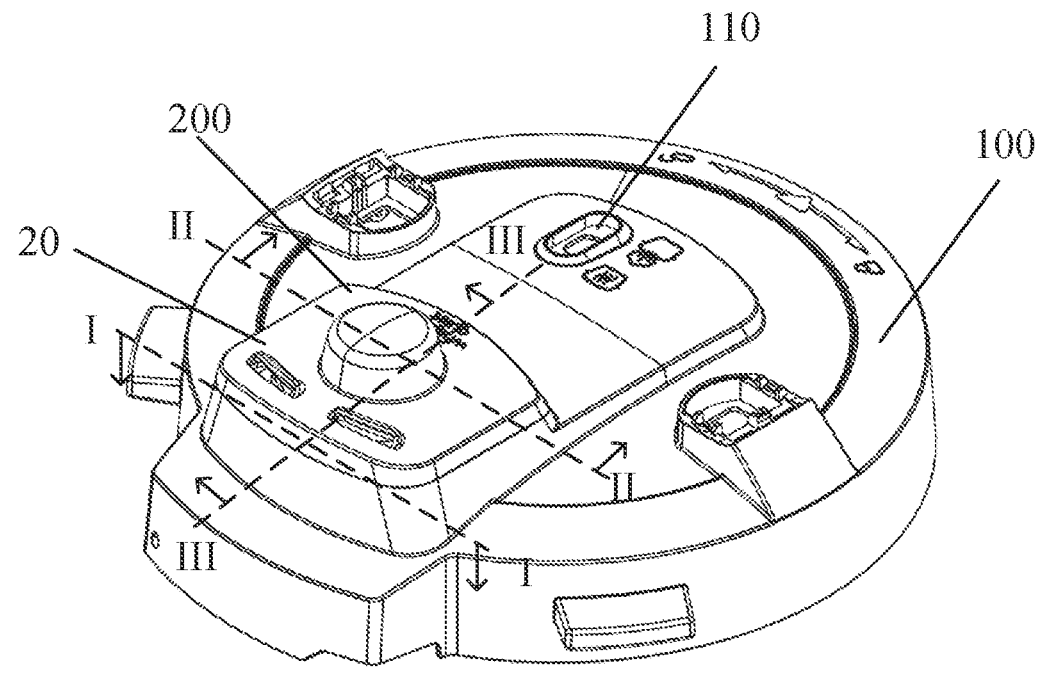
FIG. 2A is a perspective view showing a muffler of the pressure cooker of FIG. 1.
Figure 2B:
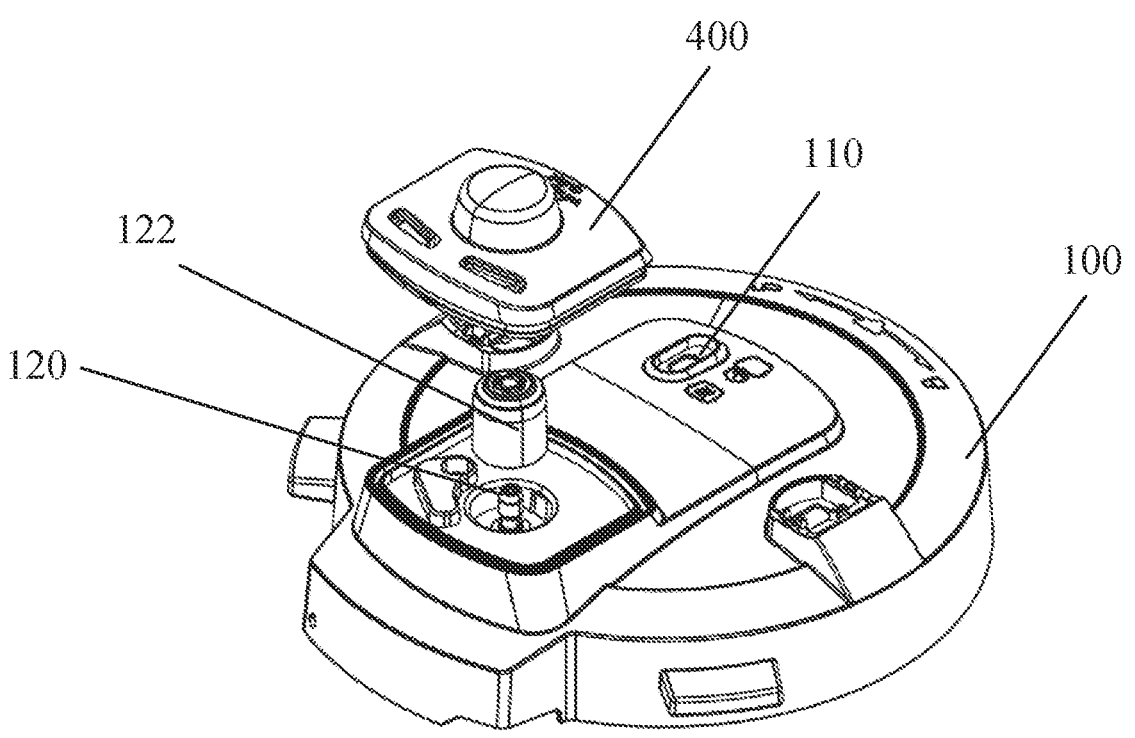
FIG. 2B is an exploded perspective view showing the muffler of the pressure cooker of FIG. 1.
Figure 2C:
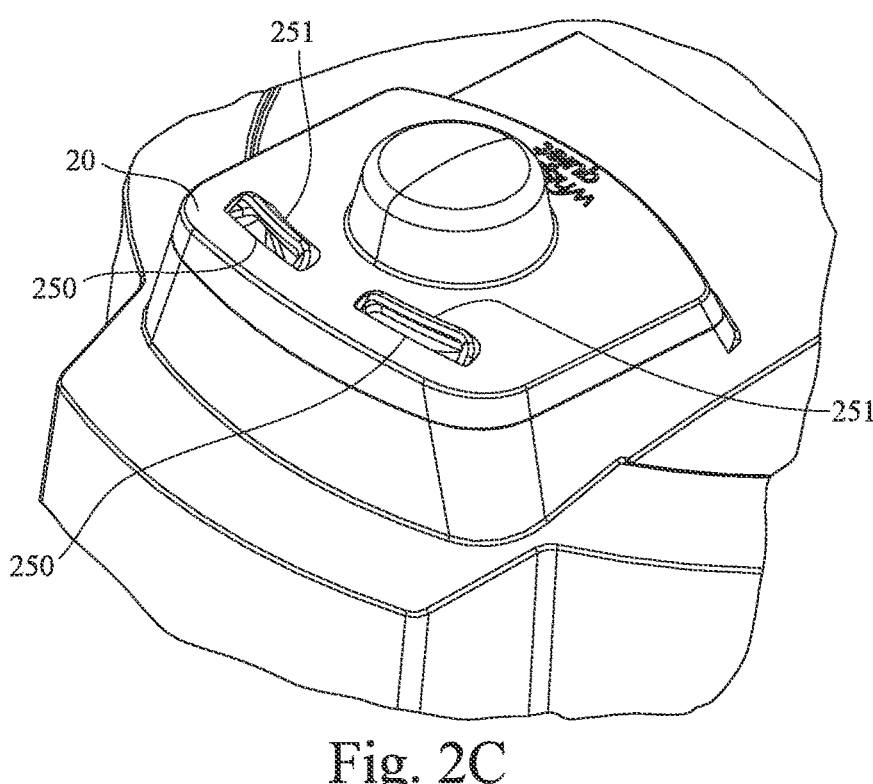
FIG. 2C is an enlarged view of the muffler.
Figure 2D:
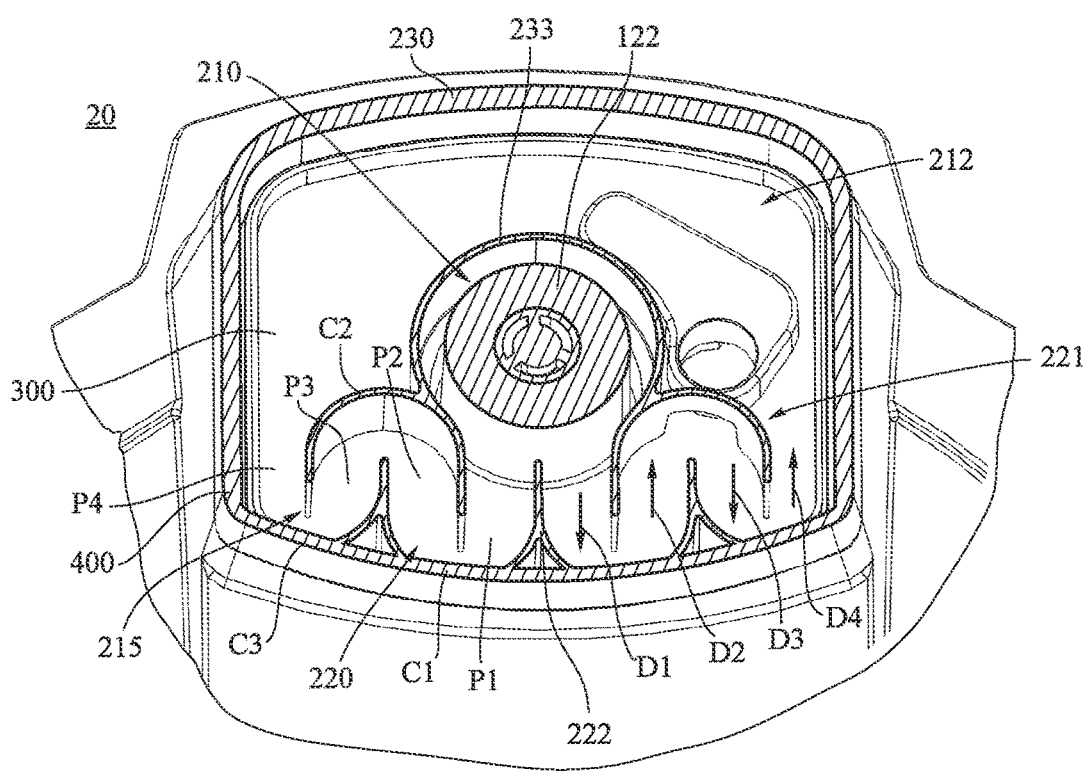
FIG. 2D is a horizontal cross-sectional view of the muffler along the cross-sectional line I-I in FIG. 2A.

FIG. 2A is a perspective view showing a muffler 20 of the pressure cooker of FIG. 1. FIG. 2B is an exploded perspective view showing the muffler 20. FIG. 2C is an enlarged view of the muffler 20. FIG. 2D is a horizontal cross-sectional view of the muffler along the cross-sectional line I-I in FIG. 2A. The muffler 20 may reduce the velocity and turbulence of the released steam from the valve, and in turn, reduce the noise associated with the steam release. In general, the muffler 20 accomplishes this objective by increasing the length of the flow path between valve 120 and the release to atmosphere, introducing obstacles placed to impact the flow of pressurized gas, introducing changes in flow direction, and/or introducing increases in the cross-sectional areas through which the pressurized gas flows. As a consequence, the pressurized gas begins to lose energy in the form of pressure, velocity, and heat, while at the same time, undergoing condensation, all resulting in a gentler release of pressurized gas from the pressure cooker 10. The muffler 20 in the instant disclosure includes embodiments that may be used on conventional non-electric pressure cookers, EPCs, and/or other appliances requiring release of pressurized gas, such as air or steam.

Figure 2E:
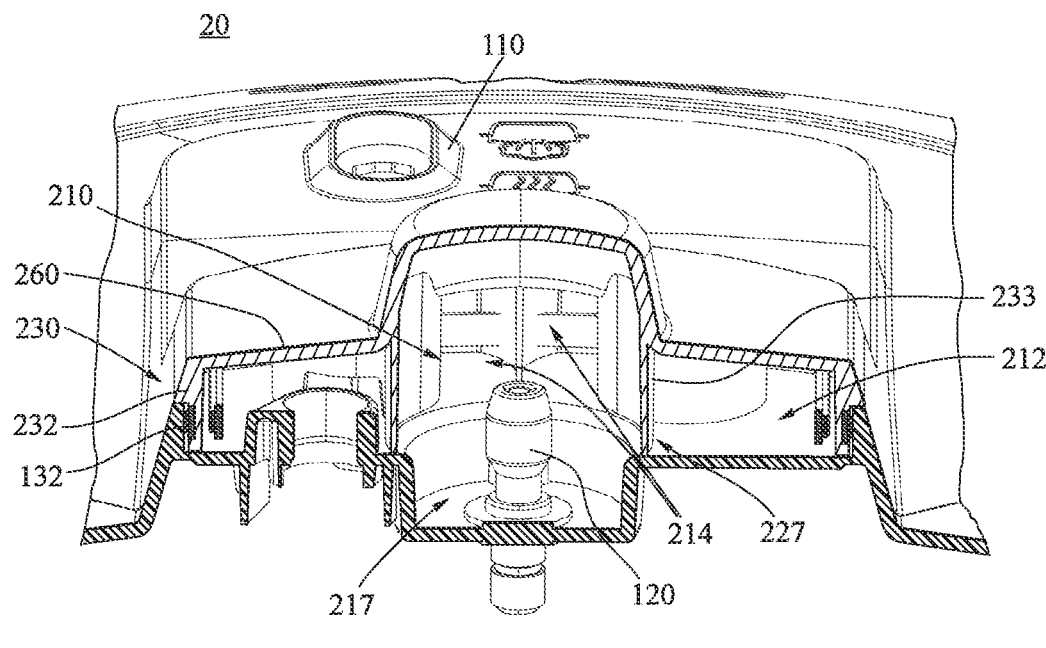
FIG. 2E is a vertical cross-sectional view of the muffler along the cross-sectional line II-II in FIG. 2A.
Figure 2F:
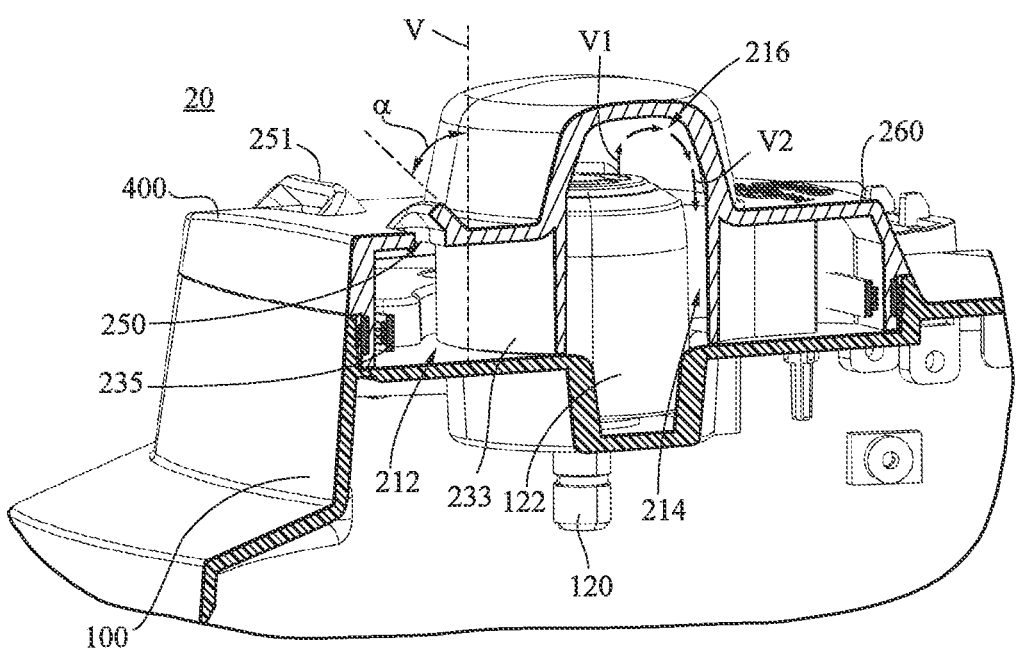
FIG. 2F is a vertical cross-sectional view of muffler along the cross-sectional line III-III in FIG. 2A.
Figure 2G:
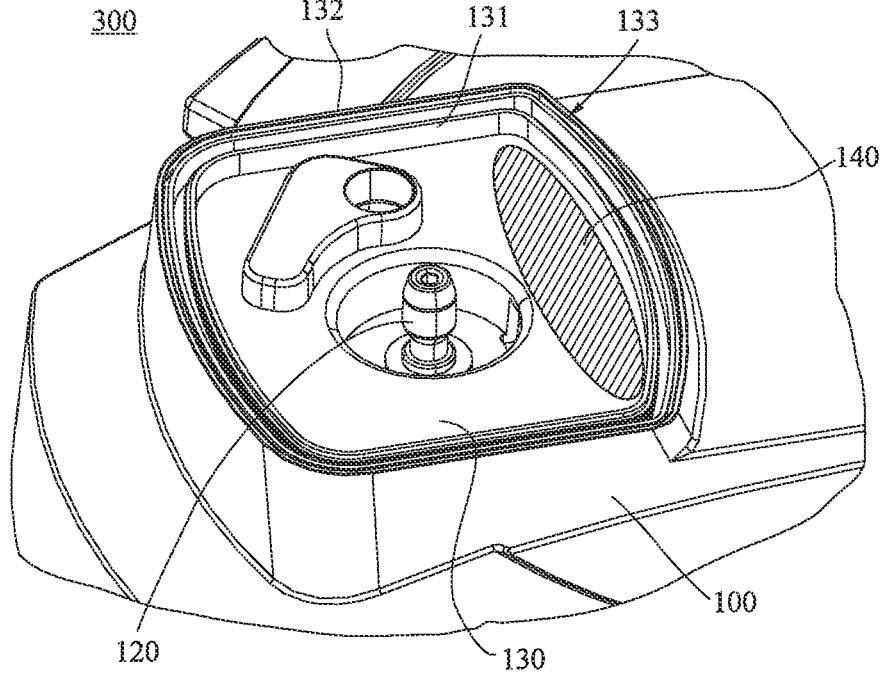
FIG. 2G is an enlarged view of a muffler base.

The muffler 20 may include a muffler cover 400 (as shown in FIGS. 3A-D) and a muffler base 300 (as shown in FIG. 2G). The muffler cover 400 may be coupled with the muffler base 300, and the muffler cover 400 may be detachable from the muffler base 300. The muffler 20 may include a first chamber 210 and a second chamber 212, as also shown in FIGS. 2E and 2F. The first chamber 210 and the second chamber 212 are positioned separately. The muffler 20 may include a first channel 220. The channel 220 is in fluid communication with the chamber 210 and the second chamber 212. In general, the second chamber 212 is defined by the space inside the muffler 20 outside of the first chamber 210 and the channels 220 and 221. The orientation of the channel 220 changes from a first direction D1 to a second direction D2 and changes from the second direction D2 to a third direction D3 (as shown in FIG. 2D). The first direction D1 may be substantially opposite to the second direction D2, and the second direction D2 may be substantially opposite to the third direction D3. Exemplarily, the channel 220 may further change from direction D3 to a fourth direction D4. The direction D4 may be opposite to the direction D3.

The muffler 20 may further include a second channel 221. Likewise, the orientation of the second channel 221 changes from the first direction D1 to the second direction D2, changes from the second direction D2 to the third direction D3, and changes from direction D3 to direction D4. The channel 220 and channel 221 may be symmetric about an intermediate wall 222 positioned between the channel 220 and channel 221. Each of the channel 220 and channel 221 may include a first portion P1 extending along the direction D1, a second portion P2 extending along the direction D2, a third portion P3 extending along the direction D3, and a fourth portion P4 extending along the direction D4. The portions P1, P2, P3, and P4 may be separated by different walls positioned therebetween. A first curved portion C1 may extend between the first portion P1 and the second portion P2. A second curved portion C2 may extend between the second portion P2 and the third portion P3. A third curved portion C3 may extend between the portion P3 and portion P4. The curved portion C1, the curved portion C2, and the curved portion C3 may each form an approximately 180-degree turn and may each have a U shape. The different portions of each of the channel 220 and channel 221 may collectively in a S shape (and optionally in a serpentine shape). Those curved portions can direct the flow of the released gas to turn 180 degree. Depending on a size of a muffler, the muffler may include more or less straight portions or curved portions with different degrees of turns. The number of the channels may also be adjusted depending on the size of the muffler. The length/number of the channels and the number of the turns (which direct the change of the flow direction of the released gas) would help deenergize pressurized gas.

As shown in FIGS. 2E and 2F, the chamber 210 may be circular and/or may optionally comprise a dome shape. The chamber 210, alternatively, may have different shapes, such as square or conical shapes, and alternatively, the chamber 210 may have a relatively flat surface, without an elevated structure (such as the dome) on the cover plate 260. The chamber 210 may be elevated from a cover plate 260 of the muffler cover 400. The gate 122 and the valve 120 may be positioned inside and/or in fluid communication with the chamber 210. When the pressurized steam exits the pressure cooker 10 via the valve 120, the steam enters the chamber 210 along a vertical direction V1 (as shown in FIG. 2F). After the pressurized steam exits the valve 120, the gas may flow vertically toward the top of the chamber 210 and impact the top of the dome, at which point it is redirected in the opposite vertical direction V2. The steam may be released from the chamber 210 via the channel 220 and channel 221 extending in a horizontal direction perpendicular to the vertical directions V1 and V2. Specifically, the steam may enter the elevated space 216 of the first chamber 210 along a vertical direction V1. The elevated space 216 is placed at a level higher than the inlet 214 of the channels 220, 221. Then, the steam would be directed by the shape of the first chamber 210 and the body of the gate 122 and thereby flow roughly alone a second vertical direction V2 to the inlet 214 of channels 220 and 221 at a lower level. The vertical direction V1 and vertical direction V2 may be opposite to each other. Then, to enter the inlet 214 of the channels 220 and 221, the steam would change its vertical flow direction to the direction D1 as guided by the orientation of the channels 220, 221. Optionally, the chamber 210 may further include an indented cavity 217 lower than the inlet 214 of the channels 220 and 221 and surrounding the nozzle of the valve 120. To enter the channels 220 and 221, the gas would flow in a vertical direction upwardly perpendicular to direction D1. These arrangements allow the released gas to make additional turns before it enters the channels 220 and 221.

The muffler 20 may further include an outer muffler wall 230, which defines an outer boundary of the chamber 212. The outer muffler wall 230 may include an inner wall 131 and an outer wall 132 of the muffler base 300 and wall 232 of the muffler cover 400. The one or more wall structures 233 that define the chamber 210 and the channels 220 and 221 may also define an inner boundary of the chamber 212. The outer muffler 230 may be used to define certain parties of the channels 220 and 221, such as the curved portions C1, C2, and C3 and the side wall of the portion P4. The volume of the chamber 212 may be larger than the combination of the volume of the chamber 210 and the channels 220 and 221. Additionally, the cross-sectional area of the chamber 212 through which the pressurized gas must flow may be larger than the cross-sectional area of the channels 220 and 221, whether considered alone or in combination. Specifically, the cross-sectional area of chamber 212 outside of the portion P4 is larger than the cross-sectional area of portion P4 of the channels 220, 221. Consequently, as the gas exits the channels 220 and 221 into the chamber 212, the velocity of the gas decreases. At the same time, at least some of the steam may begin to condensate and pool in the chamber 212.

Figure 3A:
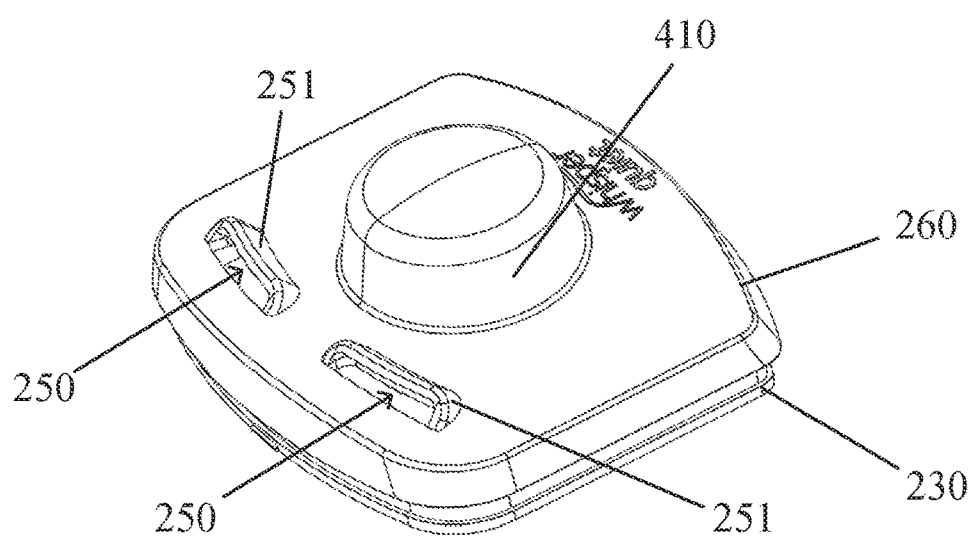
FIG. 3A is a top view of a muffler cover.
Figure 3B:
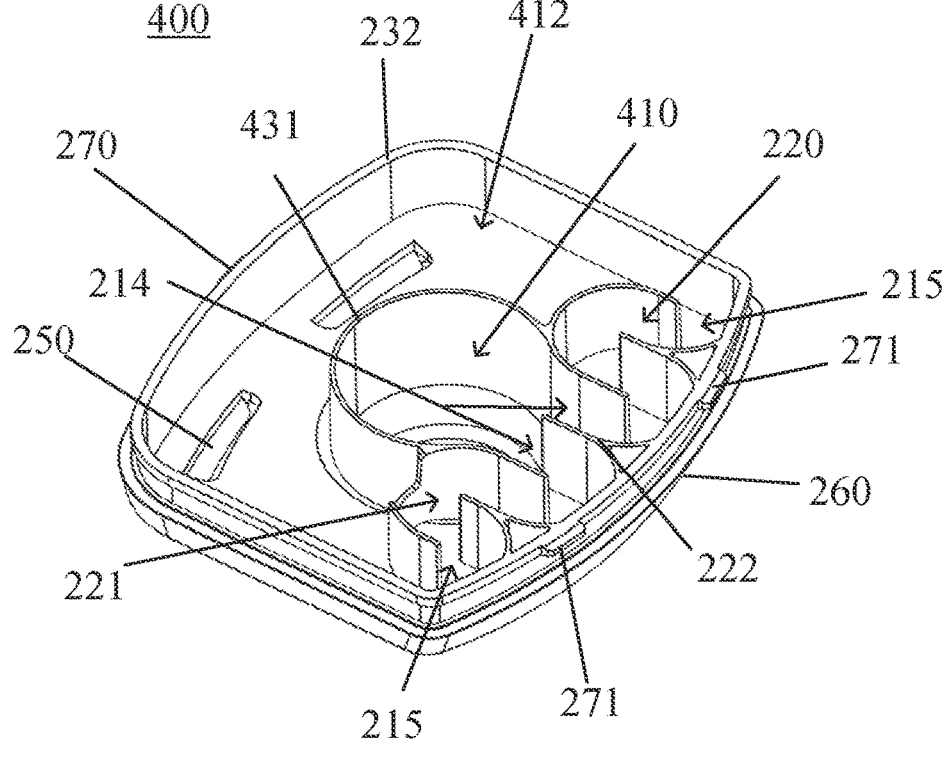
FIGS. 3B-D are bottom views of the muffler cover from different viewpoints.
Figure 3C:
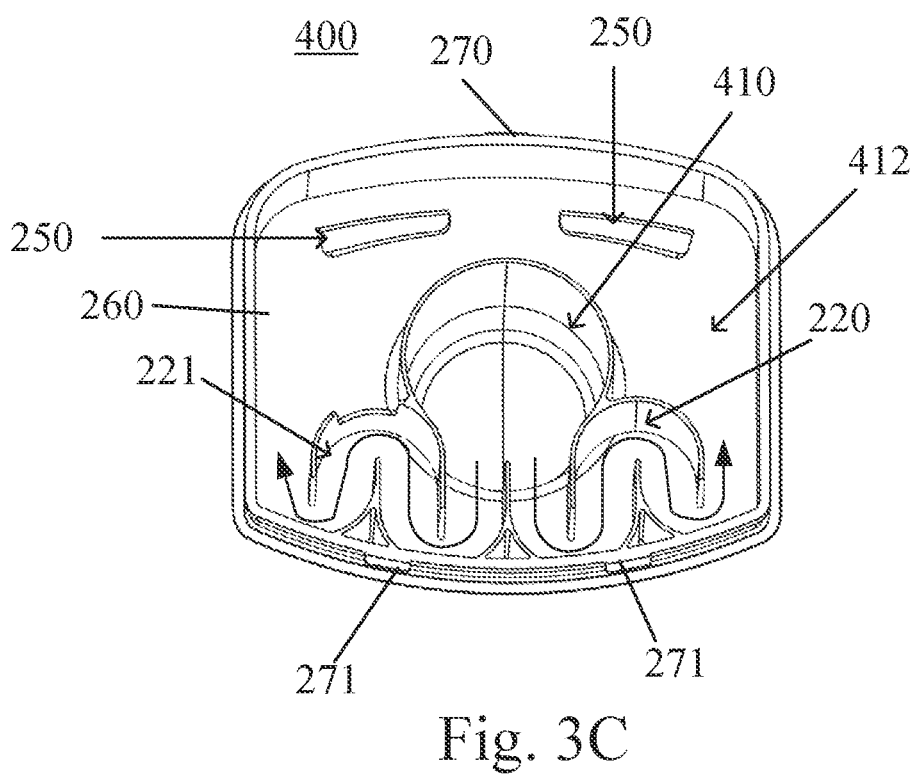
Figure 3D:
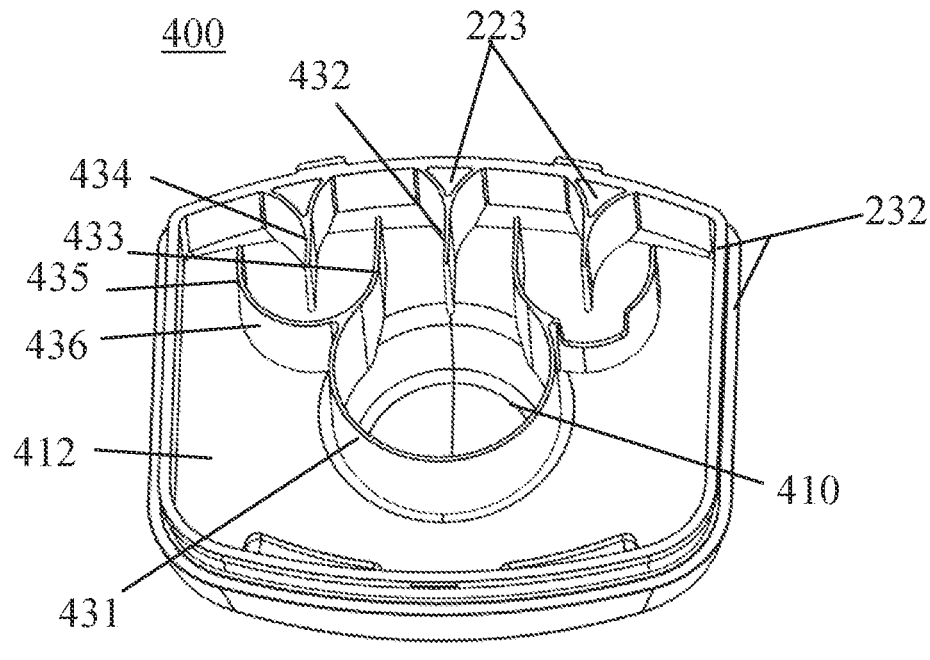

FIG. 3A is a top view of a muffler cover. FIGS. 3B-D are bottom views of the muffler cover from different viewpoints. As shown in FIGS. 3B-D, the muffler cover 400 includes room 410 and room 412. The room 410 can be form by a circular wall 431. The room 410 and the room 412 would respectively form the chamber 210 and the chamber 212 with the top of the muffler base 300 when the muffler cover 400 is coupled to the muffler base 300. The muffler cover 400 may also include channels 220, 221, and the channels 220, 221 may form enclosures, or closed channels (with certain minor gaps), with the top of the muffler base 300. The rooms 410, 412 and channels 220, 221 are defined by the one or more wall structures 233 extending from the bottom surface of the cover plate 260. Specifically, the inner wall structure 233 may include a wall 431 that forms the main portion of the room 410. The inner wall structure 233 may further include walls 432, 433, 434, and 435 alternately arranged with each other. The wall 433 and the wall 435 may be connected with a curved wall 436, and thereby, the walls 433, 435, 436 form a U shape. The walls 432 and walls 433 may extend from the outer muffler wall 230. The part of the inner wall structure 233 that forms the channel 221 may have a symmetric arrangement as to walls 432, 433, 434, and 435, but the wall 432 may be shared by the channels 220 and channel 221. Some of these walls can be at least partially hollow, as shown in the hollow structures 223 in FIG. 3D. Alternatively, these structures can be solid structures. These wall structures 233 may be of a unitary construction with the cover plate 260 of the muffler cover 400. For example, these wall structures 233 and the cover plate 260 may be formed via a single injection molding process. The walls 432 and 434 may have different thicknesses at both ends. Specifically, the thickness at the end of the wall 432 in contact with the wall 232 of the muffler cover 400 is thicker than the end opposite to the contacting end, whether or not the structure is hollow. The thickness can increase the connection between the wall 432 and the wall 232 and can create the curve to direct the released gas.

The channels 220, 221 are coupled to the room 410 via channel inlets 214. The channel inlets 214 for channels 220 and 221 may be adjacent to each other. The channels 220, 221 are coupled to the room 412 via channel outlets 215. The channel outlets 215 may be spaced apart by the different portions of the channels. As shown by the cross-sectional views of FIGS. 2E and 2F, the one or more wall structures 233 extending from the bottom surface of the cover plate 260 preferably contact the top surface of the muffler base 300, such that most or all of the steam from the valve 120 will be guided by the wall structures 233 without significant leakage. The gap 227 between the muffler base 300 and the end of the wall structure 233, if any, may be less than 5% of the height of the wall structures 233 forming the channels 220, 221.

As shown in FIGS. 2C and 3A to 3D, the muffler cover 400 may include one or more openings 250. The chamber 212 and the space out of the muffler 20 are in fluid communication via the openings 250. The steam arriving in the chamber 212 may be eventually released from the opening 250, while some of the steam may be condensed into liquid and be kept in the muffler cover 400. Additionally, the muffler cover 400 may include at least one deflector 251 for each of the openings 250. The deflector 251 may guide the steam running out of the muffler cover 400 toward a direction facing away the user, given that a user usually operates the pressure cooker 10 at the side of the control panel 15. The steam may be directed toward a side of the muffler 20 opposite to the chamber 210. For example, the steam may be directed by the deflectors 251 to run toward a direction away from the side of pressure cooker where the control panel 15 is located. In one implementation, as shown in FIG. 2F, the deflector's wall is angled from a vertical axis V of the muffler 20 for an angle α of between 0 to 90 degrees. For example, the angle can be between 30-85 degrees, 45-75 degrees, or 50-65 degrees. Specifically, the angle can be approximately 35 (plus or minus 5), 45 (plus or minus 5), 55 (plus or minus 5), 65 (plus or minus 5), 75 (plus or minus 5), 85 (plus or minus 5) degrees. The angle may control the direction of the ejecting steam, so as to avoid the steam projecting toward a cabinet residing over the pressure cooker 10, and/or to intentionally project the steam toward a backsplash positioned behind the pressure cooker 10.

FIG. 2G shows an enlarged perspective view of muffler base 300. The muffler base 300 includes a reservoir 130. The reservoir 130 has a certain depth as defined by its inner wall 131, which is elevated from the bottom of the reservoir 130. The reservoir can be used to collected condensed steam and or other particle in the released gas. Additionally, the reservoir 130 may include an outer wall 132 contoured with the inner wall 131. The inner wall 131 and the outer wall 132 collectively define a channel 133. The muffler cover may further include a gasket 235 adjacent to wall 232 and configured to seal a connection between the muffler cover 400 and the muffler base 300.

The muffler 20 may be configured on the lid 100 of the pressure cooker 10 or on the cooker body 11 of the pressure cooker 10. The muffler cover 400 may be detachably connected to the muffler base 300, such that channels 220, 221 can be easily cleaned by removing the muffler cover 400 from the muffler base 300 for washing when the muffler base 300 is integrally formed with the lid 100. The muffler cover 400 may be dishwasher compatible. On the other hand, a projection area (approximately mark as 140 in FIG. 2G) of the channels 220, 221 on the muffler base 300 is devoid of wall structures and/or is substantially flat (as shown in FIG. 2G). The projection area is the area of the muffler base 300 where the walls of channels 220, 221 directly face to or even contact with. Thus, even if the muffler base 300 is situated on a component that cannot be easily washed, the interior of the muffler base 300 can be clean by wiping without interference from walls projecting from the interior of the muffler base 300.

Exemplarily, the muffler cover 400 may include a first tooth 270 approximate to the opening 250 (as shown in FIG. 3C), and the muffler cover 400 may include one or more second teeth 271 (in this case two teeth) positioned at a side opposite to the first tooth. The number of the second teeth 271 may be larger than the first tooth 270 because the second teeth 271 are closer to the channels 220, 221 and may need to bear stronger pressurized stream.

In one implementation, at least a part of the muffler cover 400 may be translucent or transparent, providing unique aesthetic features. As used herein, the term "translucent" or "transparent" means that at least 50% of light encountering the translucent or transparent material passes through the material. For example, at least a part of the muffler cover 400 can be translucent or transparent, such that a user can see the process of steam flowing through the channels 220, 221 and/or the chambers 210, 212, and/or see if component needs to be cleaned. Specifically, a user can see through the muffler cover 400 to inspect whether the chamber 210 and channels 220, 221 is blocked by any residue in order to timely clean the muffler 20. Further, the transparent or translucent portion can allow a user to tell whether the muffler 20 works properly at the time of gas release. The visibility of steam flowing through the muffler may have the effect of rendering the gas release process less intimidating to the average consumer. The visibility also allows the user to inspect other components, such as the valve gate 122 covered by the muffler 20 without the muffler cover 400 being removed. Additionally, the shape and orientation of the inner wall structure 233 may be adjusted to obtain a different ornamental appearance without affecting the functionality of muffling the gas release.

The table below shows the comparisons of peaks noise levels, peak average noise levels, and peak noise frequency between a commercially available Instant Pot® Duo Plus V3 EPC with and without the muffler described herein. In the table below, the Duo plus V3 is an EPC with no muffler, while the Duo plus V4 is an EPC with the muffler disclosed above. In general, the muffler reduces the peak noise level, the peak average noise level, and the noise frequency of the EPC. Notably, the noise frequency is associated with the tone of the noise made by gas release regardless of the loudness of the sounds, and a higher frequency tends to make the gas release more intimidating. The peak noise level is the loudest recorded noise during the gas release, whereas the peak average noise level is a moving average peak noise level over specific time windows.

| | Duo Plus V3 | Duo Plus V4 |
| --- | --- | --- |
| Peak Noise Level (dB) | 76.49 | 65.76 |
| Peak Average Noise Level (dB) | 72.51 | 58.66 |
| Peak Frequency (Hz) | 10373 | 7542 |

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment," "an embodiment," "one aspect," or "an aspect" can mean that a particular feature, structure, or characteristic described in connection with a particular embodiment can be included in at least one embodiment of claimed subject matter. Thus, appearances of the phrase "in one embodiment," "an embodiment," "in on aspect," or "an aspect," in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. A muffler, comprising:
a first chamber, configured to receive pressurized gas;
a second chamber; and
a first channel in fluid communication with the first chamber and the second chamber, the first channel changing from a first horizontal direction to a second horizontal direction and changing from the second horizontal direction to a third horizontal direction, the first horizontal direction being substantially opposite to the second horizontal direction, the second horizontal direction being substantially opposite to the third horizontal direction;
wherein the first chamber is configured to receive pressurized gas ejecting toward an elevated space of the first chamber along a first vertical direction, the elevated space being positioned higher than an inlet of the first channel, and to direct the pressurized gas along a second vertical direction opposite to the first vertical direction to enter the first channel.

2. The muffler of claim 1, wherein at least a part of the muffler is transparent or translucent.

3. The muffler of claim 1, further comprising a second channel in fluid communication with the first chamber and the second chamber, the second channel changing from the first horizontal direction to the second horizontal direction and changing from the second horizontal direction to the third horizontal direction.

4. The muffler of claim 3, wherein at least one of the first or second channels comprises a first portion extending along the horizontal first direction, a second portion extending along the second horizontal direction, and a third portion extending along the third horizontal direction.

5. The muffler of claim 4, wherein the first portion and the second portion are separated by a first wall and the second portion and the third portion are separated by a second wall.

6. The muffler of claim 4, wherein the at least one of the first or the second channels comprises a first curved portion extending between the first portion and the second portion and a second curved portion extending between the second portion and the third portion.

7. The muffler of claim 3, further comprising:
an outer wall defining an outer boundary of the second chamber; and
an inner wall structure forming the first chamber and at least a part of the first and second channels, the inner wall structure further defining an inner boundary of the second chamber.

8. The muffler of claim 7, wherein a volume of the second chamber is larger than a volume of the first chamber plus the first and the second channels.

9. The muffler of claim 1, further comprising:
an opening positioned on the muffler and configured to release gas from the second chamber; and
a deflector adjacent to the opening, the deflector being configured to direct the released gas toward a side of the muffler opposite to the first chamber.

10. The muffler of claim 3, further comprising a muffler base and a muffler cover, the muffler cover being detachable coupled to the muffler base, wherein the muffler cover comprises an inner wall structure extending from a cover plate of the muffler cover toward the muffler base to at least partially define the first chamber and the first and second channels, the inner wall structure facing an area of the muffler base devoid of wall structures.

11. A pressure cooker, comprising:
a cooker body;
a pressure release valve in fluid communication with the cooker body;
a muffler of claim 1, configured to receive the pressurized gas from the valve.

12. The pressure cooker of claim 11, further comprising a control panel positioned on a first side of the cooker body, wherein the muffler further comprises:
an opening positioned on the muffler and configured to release the gas from the second chamber; and
a deflector adjacent to the opening, configured to direct the exhausting gas at least partially toward a second side of the cooker body opposite to the first side.

13. The pressure cooker of claim 11, wherein at least a part of the muffler is transparent or translucent.

14. The muffler of claim 9, wherein the deflector includes a wall angled between 45 degrees and 75 degrees relative to a vertical axis of the muffler to direct the released gas away from the first chamber.

15. The muffler of claim 12, wherein the deflector includes a wall angled between 45 degrees and 75 degrees relative to a vertical axis of the muffler to direct the exhausting gas at least partially toward the second side of the cooker body opposite to the first side.

16. A muffler cover for an appliance, comprising:
a first room;
a second room positioned separate from the first room; and
a first channel, connected to the first room via a first inlet and connected to the second room via a first outlet, the first channel changing from a first horizontal direction to a second horizontal direction and changing from the second horizontal direction to a third horizontal direction, the first horizontal direction being substantially opposite to the second horizontal direction, the second horizontal direction being substantially opposite to the third horizontal direction, wherein at least a part of the muffler cover is transparent or translucent;
wherein the first room is configured to receive pressurized gas ejecting toward an elevated space of the first room along a first vertical direction, the elevated space being positioned higher than the first inlet, and to direct the pressurized gas along a second vertical direction opposite to the first vertical direction to enter the first inlet.

17. The muffler cover of claim 16, further comprising a second channel connected to the first room via a second inlet and connected to the second room via a second outlet, the second channel changing from the first horizontal direction to the second horizontal direction and changing from the second horizontal direction to the third horizontal direction.

18. The muffler cover of claim 17, wherein at least one of the first or second channels comprises a first portion extending along the first horizontal direction, a second portion extending along the second horizontal direction, and a third portion extending along the third horizontal direction.

19. The muffler cover of claim 18, wherein the first portion and the second portion are separated by a first wall and the second portion and the third portion are separated by a second wall.

20. The muffler cover of claim 18, wherein the at least one of the first or second channels comprises a U-shaped first curved portion extending between the first portion and the second portion and a second curved portion extending between the second portion and the third portion.

* * * * *